(12) United States Patent
Hashimoto et al.

(10) Patent No.: US 7,338,279 B2
(45) Date of Patent: Mar. 4, 2008

(54) AIR BAG COVER BODY FORMING APPARATUS

(75) Inventors: Haruya Hashimoto, Ikeda (JP); Shinya Takemura, Ikeda (JP); Yuji Saito, Ikeda (JP); Kenji Hashimoto, Ikeda (JP); Kazuhito Ishida, Ikeda (JP); Ayumu Imaoka, Aichi (JP)

(73) Assignees: Daihatsu Motor Co., Ltd., Osaka (JP); Tatematsu Mold Works Co., Ltd., Aichi (JP)

( * ) Notice: Subject to any disclaimer, the term of this patent is extended or adjusted under 35 U.S.C. 154(b) by 0 days.

(21) Appl. No.: 10/528,594

(22) PCT Filed: Sep. 26, 2003

(86) PCT No.: PCT/JP03/12375

§ 371 (c)(1),
(2), (4) Date: Mar. 21, 2005

(87) PCT Pub. No.: WO2004/030892

PCT Pub. Date: Apr. 15, 2004

(65) Prior Publication Data

US 2006/0034974 A1    Feb. 16, 2006

(30) Foreign Application Priority Data

Sep. 30, 2002 (JP) .............................. 2002-286495
Sep. 30, 2002 (JP) .............................. 2002-286496
Sep. 30, 2002 (JP) .............................. 2002-286497
Sep. 30, 2002 (JP) .............................. 2002-486498

(51) Int. Cl.
*B29C 33/44* (2006.01)
*B29C 45/40* (2006.01)

(52) U.S. Cl. .................... 425/577; 425/443; 425/556

(58) Field of Classification Search ................ 425/443, 425/444, 556, 577
See application file for complete search history.

(56) References Cited

U.S. PATENT DOCUMENTS 3,940,103 A * 2/1976 Hilaire ........................ 249/68

(Continued)

FOREIGN PATENT DOCUMENTS

JP          3-110024         5/1991

(Continued)

OTHER PUBLICATIONS

Japanese Office Action for corresponding JP application 2002-286495, mailed Aug. 22, 2006.

(Continued)

*Primary Examiner*—Yogendra Gupta
*Assistant Examiner*—Emmanuel S Luk
(74) *Attorney, Agent, or Firm*—Hamre, Schumann, Mueller & Larson, P.C.

(57) ABSTRACT

An air bag cover body forming apparatus, comprising forming molds (2A, 2B), groove-forming blades (3), and support rods (4), wherein the forming molds form a cavity (20) for forming a resin air bag cover body (1) having air bag door parts, the groove-forming blades form rupture grooves (11) determining the air bag door parts in the air bag cover body, and the support rods support the air bag door parts of the air bag cover body formed in the cavity. The forming molds comprising movable cores (21a, 21b) reciprocatingly movable between a position where the molds are allowed to abut on the air bag cover body and a position where the molds are separated from the air bag cover body, wherein when the cores are separated from the air bag door parts, the support rods are allowed to abut on the air bag door parts to prevent an excessive stress concentration from occurring in the rupture grooves.

17 Claims, 16 Drawing Sheets

U.S. PATENT DOCUMENTS

| | | | | |
|---|---|---|---|---|
| 4,306,851 | A | * 12/1981 | Thune | 425/468 |
| 4,867,672 | A | * 9/1989 | Sorensen | 425/577 |
| 5,112,207 | A | * 5/1992 | Pinsonneault | 425/192 R |
| 5,492,658 | A | * 2/1996 | Ohno et al. | 264/40.1 |
| 5,762,983 | A | 6/1998 | Nimura et al. | |
| 5,895,621 | A | * 4/1999 | Tajiri et al. | 264/318 |
| 6,042,363 | A | * 3/2000 | Kikuchi | 425/556 |
| 6,109,645 | A | * 8/2000 | Totani et al. | 280/728.3 |
| 6,187,247 | B1 | * 2/2001 | Buzzell et al. | 264/334 |
| 6,378,894 | B1 | 4/2002 | Trevino et al. | |

FOREIGN PATENT DOCUMENTS

| | | |
|---|---|---|
| JP | 6-339950 | 12/1994 |
| JP | 7-47574 | 2/1995 |
| JP | 7-125009 | 5/1995 |
| JP | 7-164500 | 6/1995 |
| JP | 8-11151 | 1/1996 |
| JP | 8-244081 | 9/1996 |
| JP | 9-141669 | 6/1997 |
| JP | 10-323866 | 12/1998 |
| JP | 11-34124 | 2/1999 |
| JP | 11-192647 | 7/1999 |
| JP | 2000-225633 | 8/2000 |
| JP | 2001-39254 | 2/2001 |
| JP | 2001-47959 | 2/2001 |
| JP | 2001-88175 | 4/2001 |
| JP | 2002-234413 | 8/2002 |
| JP | 2004-25821 | 1/2004 |

OTHER PUBLICATIONS

Japanese Office Action for corresponding JP application 2002-286496, mailed Aug. 22, 2006.

Japanese Office Action for corresponding JP application 2002-286497, mailed Aug. 22, 2006.

Japanese Office Action for corresponding JP application 2002-286498, mailed Aug. 22, 2006.

* cited by examiner

AIR BAG COVER BODY FORMING APPARATUS

TECHNICAL FIELD

The present invention relates to an air bag cover forming apparatus. The "air bag cover" described in the present invention is utilized for covering an air bag device in a vehicle such as a car. The typical example of an air bag cover is an instrument panel.

BACKGROUND ART

Generally, an air bag device for the passenger seat is attached inside of an instrument panel. Conventional attaching mechanisms for air bag device are disclosed in JP-A-2001-39254 and JP-A-2001-47959, for example.

FIG. 16 is a schematic view illustrating an example of conventional instrument panel (indicated by reference number 1). FIG. 17 illustrates an air bag device 8 attached inside the instrument panel 1. The instrument panel is made of resin and formed with an air bag door 10 facing the air bag device 8. The rear side of the instrument panel 1 is formed with a plurality of grooves defining the air bag door 10. As shown in FIG. 16, the grooves 11 include three grooves 11a-11c extending longitudinally of the instrument panel 1 and two grooves 11d, 11e extending perpendicularly to the three longitudinal grooves. The portions formed with the grooves are weaker than the other portions of the instrument panel 1. With such an arrangement, when the air bag (not shown) of the air bag device 8 inflates, the portions formed with the grooves 11 are broken due to the pressure by the air bag. As a result, as shown by the phantom lines in FIG. 17, the air bag door 10 is opened and the air bag comes out of the instrument panel 1.

It is desirable that the air bag door 10 is designed to be prevented from flying into pieces when the air bag door 10 opens. To achieve this, the air bag door 10 is supported by a retainer 80, for example. The retainer 80 is made of a bendable metal plate, and includes an end attached to the air bag device 8. The other end of the retainer 80 is fixed to a rib 13 formed at the rear side of the air bag door 10. Due to this structure, the air bag door 10 is prevented from flying into pieces by the retainer 80 when the air bag door 10 opens.

The instrument panel 1 may be molded from resin material utilizing a molding apparatus B as shown in FIG. 18. The molding apparatus B includes an upper portion 7A, a lower portion 7B, and a plurality of grooving blades 39. The upper portion 7A and the lower portion 7B form a cavity 70 for molding the instrument panel 1. Each grooving blade includes a tip end inserted into the cavity 70 for forming the break grooves 11 at the instrument panel 1. Though it is not shown in FIG. 18, the grooving blade 39 is a rectangular plate. The base ends of the grooving blades 39 are connected to each other.

After the instrument panel 1 is molded in the cavity 70, the upper portion 7A and the lower portion 7B are separated. (JP-A-11-34124 discloses an example of an apparatus for reciprocally moving a mold for resin molding within a predetermined area.) Then, the instrument panel 1 is taken out of the mold.

However, in the prior art, as described below, the instrument panel may not be taken out properly from the mold.

When the instrument panel 1 is taken out from the lower portion 7B, the air bag door 10 tends to remain in the mold more often than the other portions. One cause of this is the ribs 13 formed at the air bag door 10. As the ribs 13 increase the contacting area of the air bag door 10 and the lower portion 7B, the air bag door 10 is not easily separated from the lower portion 7B. If the instrument panel 1 is forcibly pulled to be separated from the lower portion 7B when the air bag door 10 intimately contacts with the lower portion 7B, the weak portions formed with the break groove 11 may be bent or damaged. Further, the bent break groove 11 may be whitened.

DISCLOSURE OF THE INVENTION

The present invention has been proposed under the above-described circumstances. It is therefore an object of the present invention to provide a forming apparatus designed to prevent concentration of too much stress on a break groove formed at a resin molded body.

According to the present invention, there is provided an apparatus for forming an air bag cover. The forming apparatus comprises a mold for forming a cavity in which a resin air bag cover having an air bag door is molded, a grooving blade for forming a break groove defining the air bag door at the air bag cover and a supporting member for supporting the air bag door of the air bag cover molded in the cavity. The apparatus includes a movable core reciprocally movable in a first reciprocal direction parallel to a line connecting a position where the core contacts the air bag cover and a position where the core is separated from the air bag cover. The supporting member comes into supporting contact with the air bag door when the core is separated from the air bag door.

Preferably, the supporting member is a rod extending through the movable core.

Preferably, the movable core includes a recess for forming a rib at the air bag door, and the supporting member contacts with the air bag door at a portion adjacent to the rib.

Preferably, the forming apparatus of the present invention further comprises a follower block connected to the movable core and reciprocally movable in the first reciprocal direction, a drive block contacting the follower block and first drive source for reciprocally moving the drive block along a second reciprocal direction perpendicular to the first reciprocal direction. The follower block is moved in the first reciprocal direction by the movement of the drive block in the second reciprocal direction.

Preferably, at least one of the drive block and the follower block is formed with an inclined cam surface for moving the follower block in the first reciprocal direction.

Preferably, the drive block is formed with an inclined cam surface for moving the follower block in the first reciprocal direction and also formed with a pressure receiving surface which is next to the inclined cam surface and is parallel to the second reciprocal direction.

Preferably, the follower block is formed with an inclined cam surface which is brought into contact with the inclined cam surface of the drive block and also formed with a plan surface which is next to the inclined cam surface of the follower block and is brought into contact with the pressure receiving surface of the drive block.

Preferably, the molding apparatus according to the present invention further comprises a link for connecting the drive block and the follower block. The link pulls the follower block away from the air bag door in accordance with the movement of the drive block.

Preferably, the link includes a first end and a second end spaced from each other. The first end rotatably is attached to the drive block, while the second end projects into a recess formed in the follower block.

Preferably, the forming apparatus of the present invention further comprises a second drive source for moving the grooving blade in the first reciprocal direction. The second drive source moves the grooving blade between a position to be inserted in the cavity and a position to be moved out of the cavity.

Preferably, the mold includes an upper portion and a lower portion for working together to form the cavity. The lower portion includes a support body and an auxiliary block removable from the body, and the auxiliary block is formed with a space for movably incorporating the grooving blade in the first reciprocal direction. The second drive source is provided at the support body.

Preferably, the space of the auxiliary block further accommodates the follower block and the drive bock, and the first drive source is provided at the support body.

Preferably, the first drive source is connected to the drive block via a connecting rod removably attached to the drive block, while the second drive source is connected to the grooving blade via another connecting rod removably attached to the grooving blade.

Preferably, the molding apparatus according to the present invention further comprises a cooling means for cooling the movable core.

Preferably, the cooling means includes a duct provided in the movable core through which cooling medium passes.

Preferably, the cooling means further includes another duct which is provided in the follower block and connected to the duct in the movable core.

BEST MODE FOR CARRYING OUT THE INVENTION

Preferred embodiments of the present invention are described below with reference to the drawings.

Figure 1:
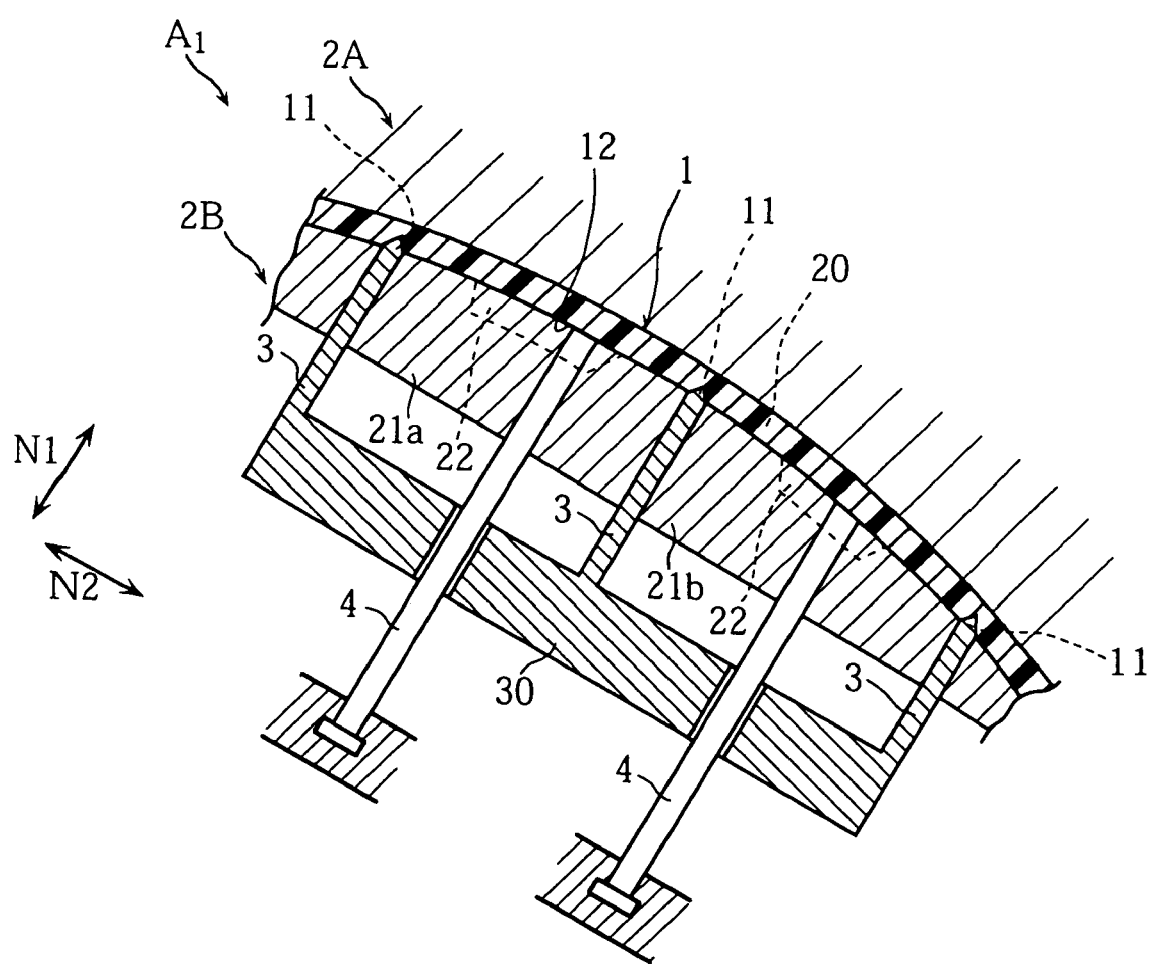
FIG. 1 is a section view illustrating a principal part of a molding apparatus according to a first embodiment of the present invention.
Figure 2:
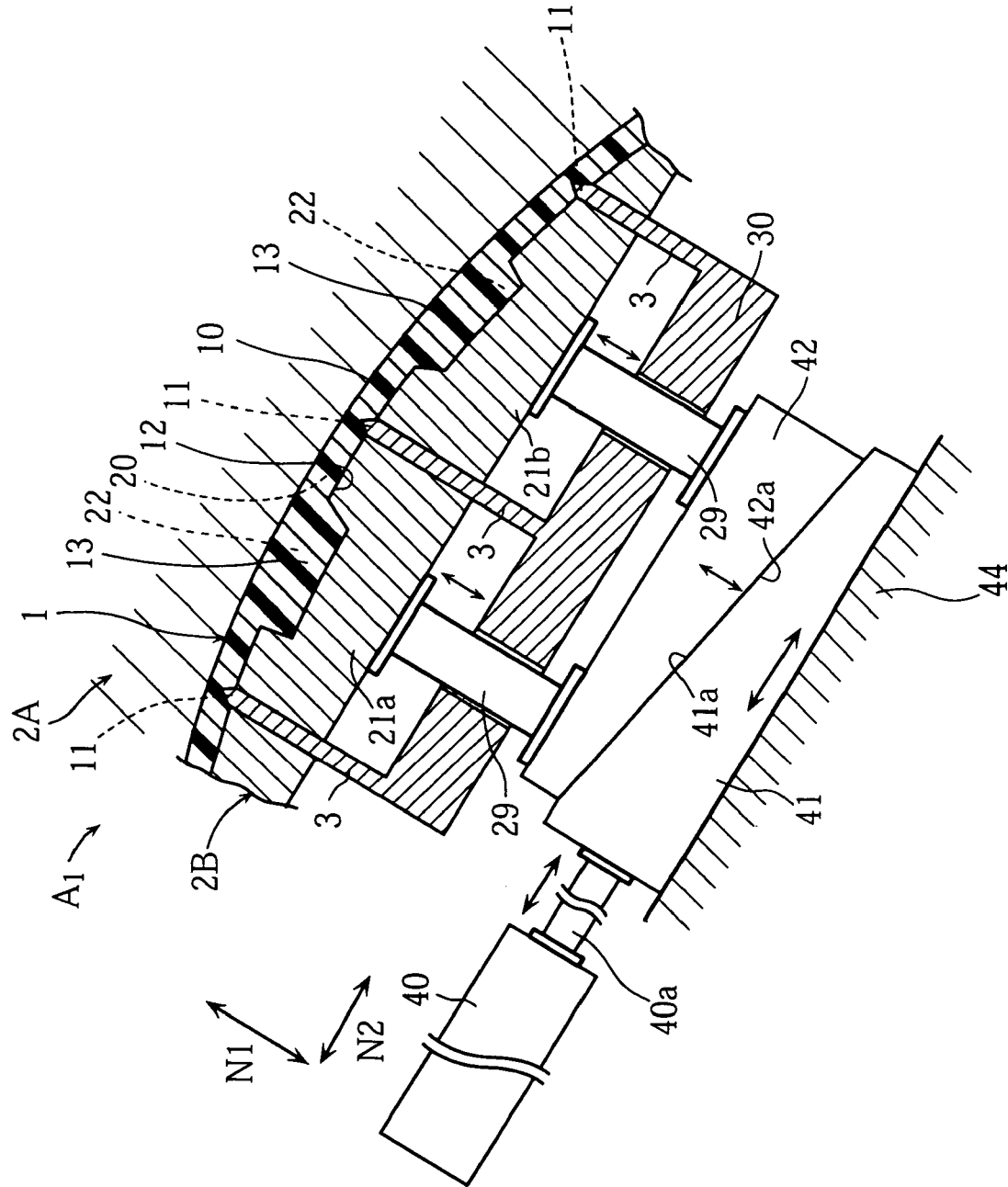
FIG. 2 is a view illustrating the function of a drive block and a follower block of the molding apparatus according to the first embodiment.
Figure 3:
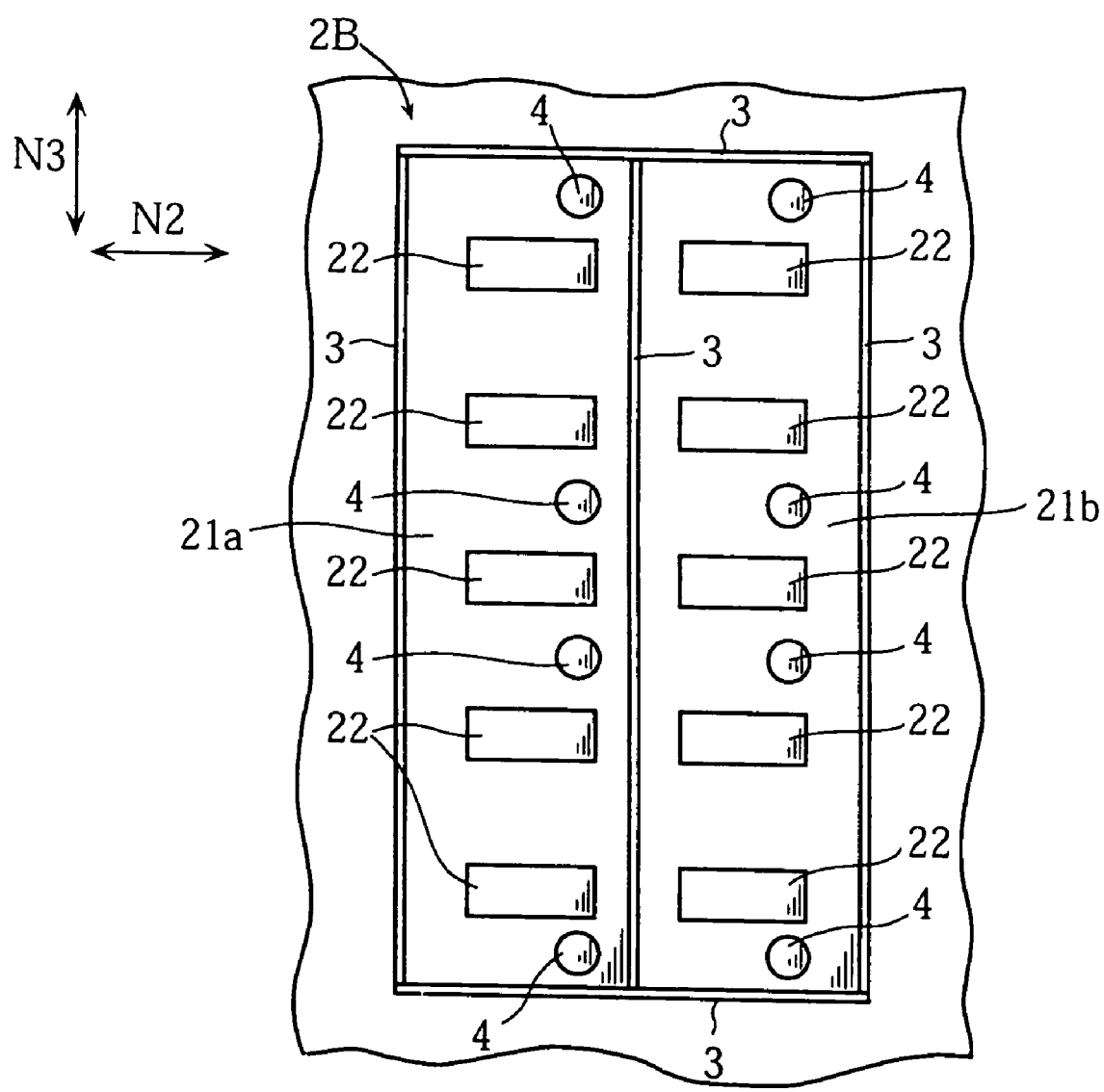
FIG. 3 is a plan view illustrating a principal part of the lower portion of the molding apparatus according to the first embodiment.
Figure 16:
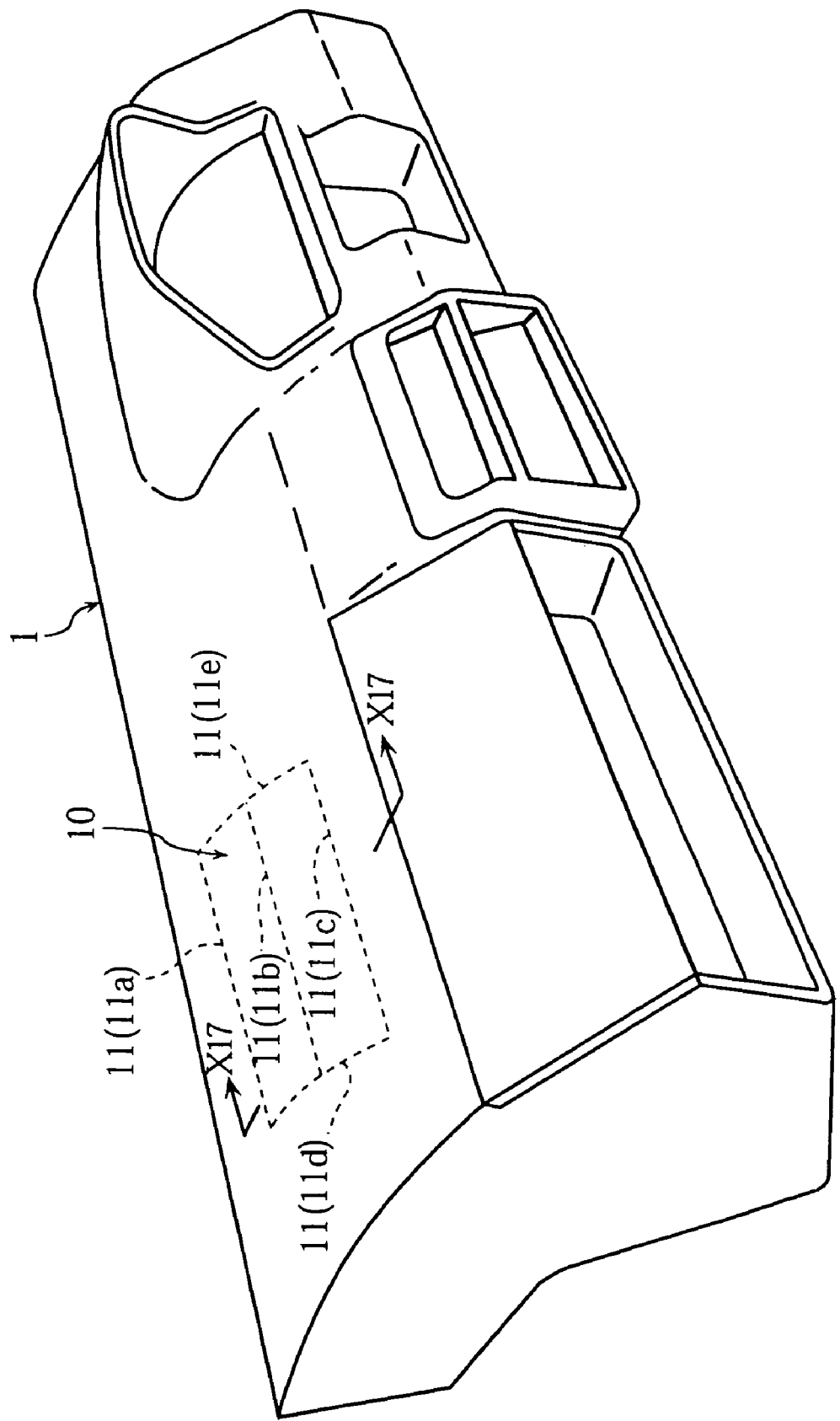
FIG. 16 is a schematic view illustrating an example of conventional instrument panel.
Figure 17:
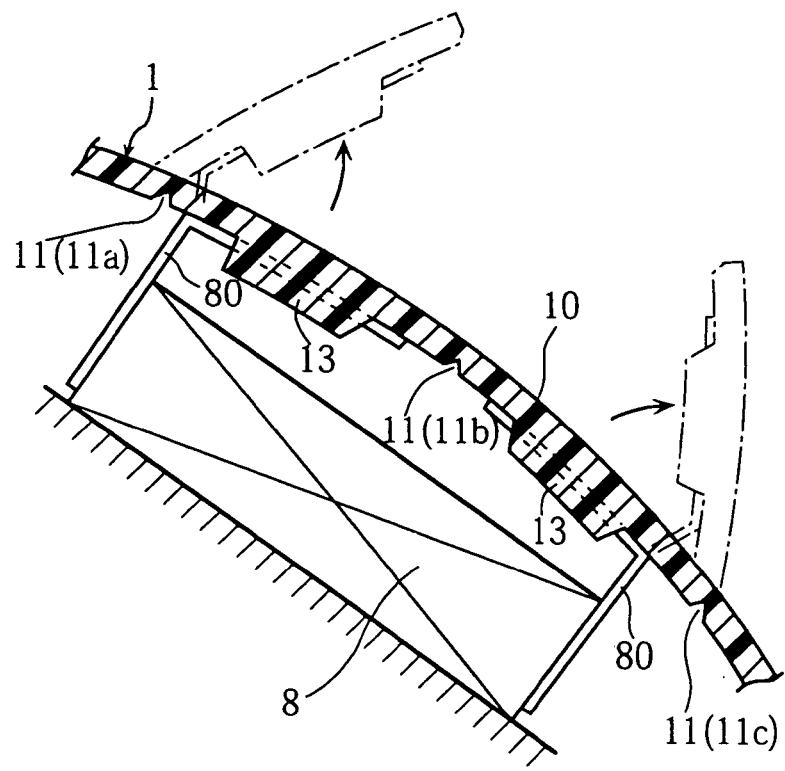
FIG. 17 is a section view taken along lines X17-X17 in FIG. 16.
Figure 18:
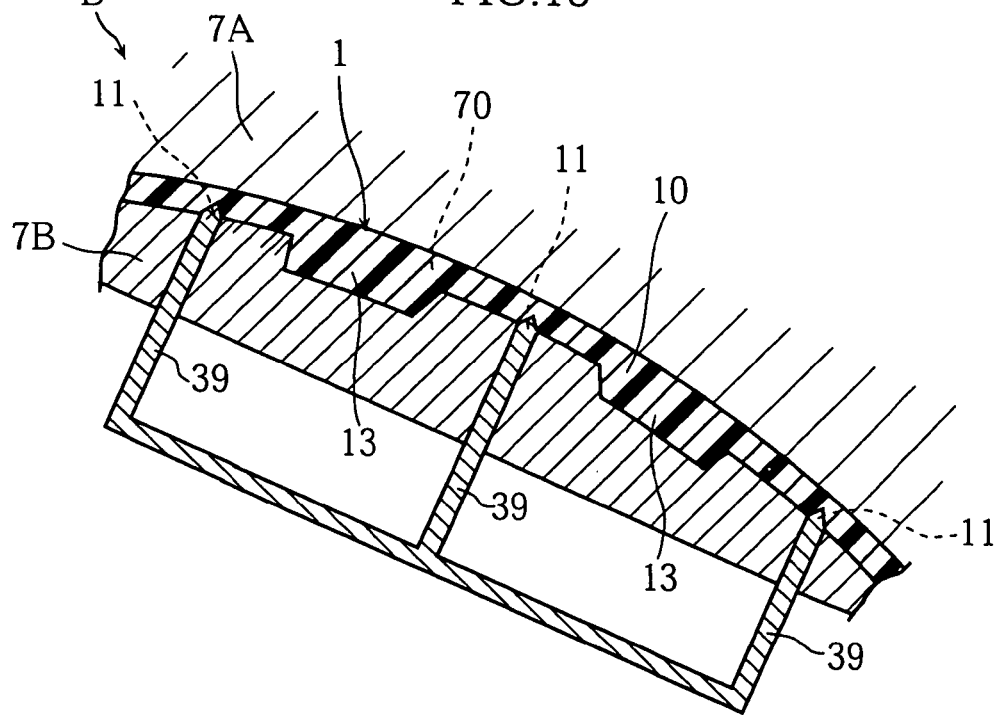
FIG. 18 is a section view illustrating a principal part of a conventional molding apparatus.

FIGS. 1-3 illustrate a molding apparatus A1 according to a first embodiment of the present invention. The molding apparatus A1 is used to mold the above-described conventional instrument panel 1 (refer to FIGS. 16-18).

As shown in FIGS. 1 and 2, the molding apparatus A1 includes a mold having an upper portion 2A and a lower portion 2B. The molding apparatus A1 further includes a plurality of grooving blades 3 and supporting rods 4.

The upper portion 2A and the lower portion 2B move toward and away from each other. In the illustrated example, only the upper portion 2A is movable while the lower portion 2B is immovable. The upper portion 2A moves, for example, horizontally or vertically. The upper portion 2A and the lower portion 2B are clamped to form a cavity 20 for molding the instrument panel 1. The lower portion 2B includes two movable cores 21a, 21b.

The grooving blades 3 include tip ends inserted into the cavity 20 to form a plurality of break grooves 11. The grooving blades 3 are metal plates connected to each other to form a rectangle corresponding to the break grooves 11, as viewed in plane (refer to FIG. 3). The grooving blades 3 further include bases connected to each other via a connecting member 30. The grooving blades 3 are movable toward the cavity 20 and in the opposite direction (a direction N1) by a drive source having a reciprocating cylinder for example. With such an arrangement, the tip end of the grooving blade 3 can be moved out of the cavity 20 when the cavity 20 is filled with melted resin. As a result, resin can smoothly flow into all portions of the cavity 20. The tip end of the grooving blades 3 are inserted into the cavity 20 after the cavity 20 is filled with resin and before the resin is hardened. In this way, the break groove 11 is formed at the instrument panel 1. Differently from the illustrated example, the grooving blade 3 may be immovable in the direction N1. In this case, the tip end of the grooving blade 3 remains being inserted in the cavity 20.

The supporting rods 4 are made of metal and extend to penetrate thicknesswise of the connecting member 30 of the grooving blade 3 as well as the cores 21a, 21b of the lower portion 2B. The supporting rods 4 are fixed at portions below the lower portion 2B. Each supporting rod 4 includes a top surface partly forming the surface of the cavity 20. Thus, as shown in FIG. 1, the top surface of the supporting rod 4 contacts a lower surface 12 of an air bag door 10 formed in the cavity 20.

Specifically, the cores 21a, 21b of the lower portion 2B are formed with a plurality of recesses 22 for forming a plurality of ribs 13 to which retainers are attached. As shown in FIG. 3, the recesses 22 are arranged in two rows and properly spaced to each other in a direction N3 (the longitudinal direction of the cavity 20 or the instrument panel 1). In the example shown in FIG. 3, eight connecting rods 4 are used in total. Each rod 4 is arranged adjacent to one or two recesses 22.

The cores 21a, 21b of the lower portion 2B form the lower surface 12 of the air bag door 10. The cores 21a, 21b are formed separately from the other parts of the lower portion 2B, and are surrounded by the grooving blades 3. The cores 21a, 21b are movable slidably relative to the connecting rod 4 and also movable reciprocally in the longitudinal direction (the direction N1) of the connecting rod. A mechanism used for the reciprocal movement, as shown in FIG. 2, includes a drive block 41, a follower block 42, a drive source 40 such as a hydraulic reciprocating cylinder. The drive block 41 is connected to the drive source 40 via a rod 40a and is reciprocally movable by the drive source 40 in a direction N2 on a base 44. The drive block 41 and the follower block 42 include inclined surfaces 41a, 42a slidable to each other. According to the reciprocal movement of the drive block 41 in the direction N2, the follower block 42 moves up and down in the direction N1. The two cores 21a, 21b are connected to the follower block 42 via connecting rods 29 and move up and down according to the movement of the follower block 42.

When the cavity 20 is filled with resin to form the instrument panel 1, the cores 21a, 21b are subjected to downward pressure in the direction N1. In the mechanism shown in FIG. 2, the applied pressure is supported by the drive block 41. As a result, the drive source 40 needs not to support the pressure directly, whereby the drive source 40 can be downsized.

Next, the function of the molding apparatus A1 is described below.

Figure 4:
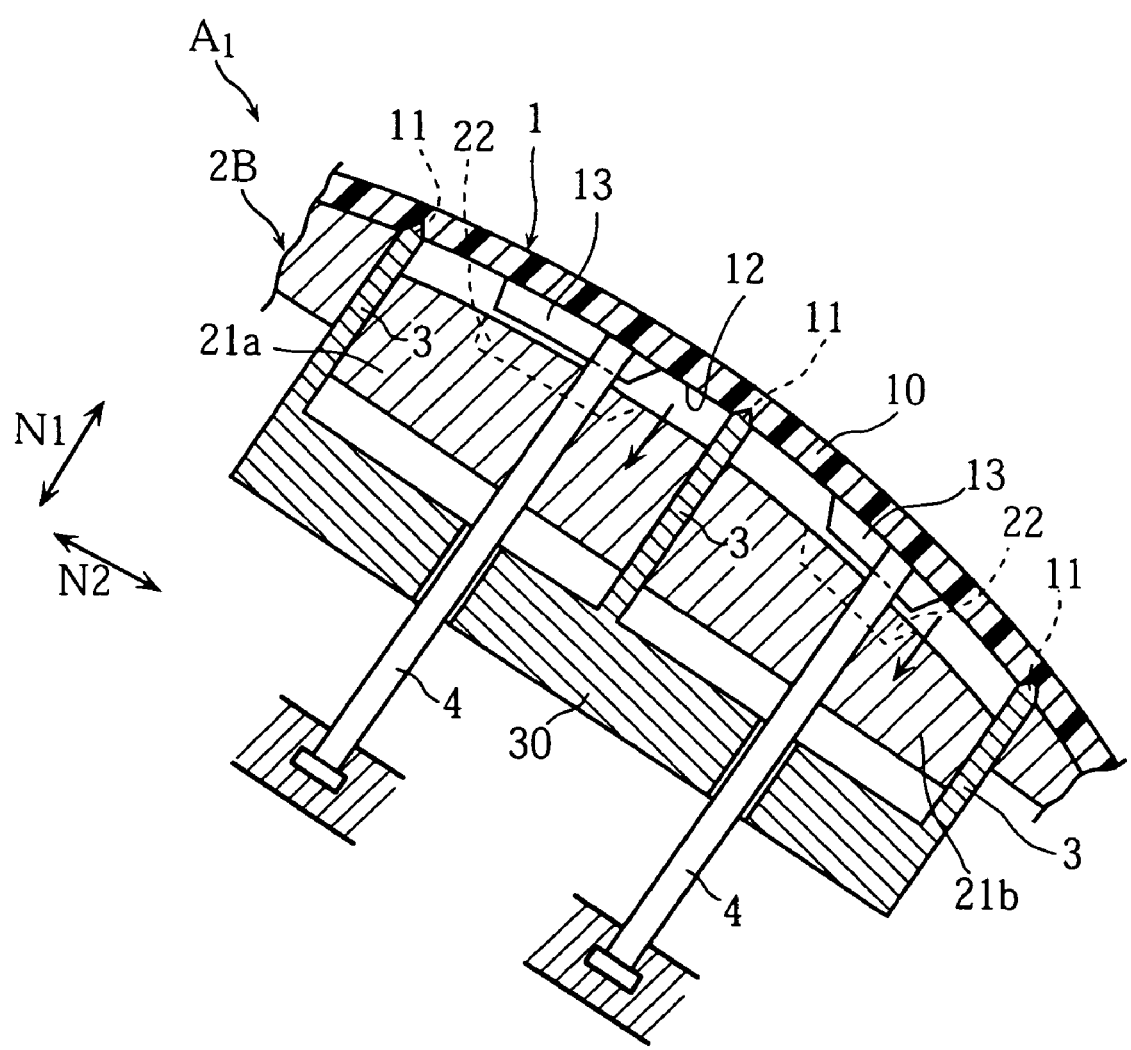
FIG. 4 is a section view illustrating the function of the lower portion of the molding apparatus according to the first embodiment.

First, as shown in FIGS. 1 and 2, the cavity 20 formed by the upper portion 2A and the lower portion 2B is filled with resin to mold the instrument panel 1. Next, the upper portion 2A is lifted to move away from the lower portion 2B. Then, as shown in FIG. 4, the cores 21a, 21b of the lower portion 2B move downward in the direction N1. Specifically, as shown in FIG. 2, the drive source 40 moves the drive block 41 toward the left side in the direction N2. Due to this movement, the cores 21a, 21b (and the follower block 42) are moved downward in the direction N1 by the gravitational force.

The recesses 22 for forming the ribs 13 of the air bag door 10 are formed at the cores 21a, 21b. Thus, the downward movement of the cores 21a, 21b generates downward force to move the air bag door 10 together with the cores 21a, 21b. On the other hand, the supporting rods 4 contacting the air bag door 10 prevent the downward movement of the air bag door 10. Since the supporting rods 4 are immovable, the air bag door 10 is not lifted relative to the other portions of the instrument panel 1.

In this way, the air bag door 10 and the cores 21a, 21b can be properly separated without applying large stress concentration on the portions where the break grooves 11 of the instrument panel 1 are formed. Further, due to the connecting rods 4 arranged adjacent to the recesses 22 (or the ribs 13), the portion formed with the break grooves 11 does not receive much force applied when the air bag door 10 and the cores 21a, 21bi are separated.

If the cores 21a, 21b are very intimately fixed to the air bag door 10, the follower block 42 and the cores 21a, 21b may not be lowered only by the gravitational force even the drive block 41 is moved toward the drive source 40. In this case, a proper auxiliary means may be preferably provided for forcibly pulling down the follower block 42 (refer to the second embodiment).

After the cores 21a, 21b are lowered as described above, the instrument panel 1 is taken out of the lower portion 2B. Similarly to a general metal molding apparatus, the lower portion 2B is provided with a plurality of extruding pins (not shown) at the portions other than the cores 21a, 21b for extruding a molded piece. The extruding pins are used to press the instrument panel 1 at the portions other than the air bag door 10, so that the instrument panel 1 is taken out of the lower portion 2B. It is not difficult to provide the extruding pins reciprocally movable at the portions where the cores 21a, 21b and the grooving blades 3 are not formed, or at the portions which do not contact the air bag door 10 of the instrument panel 1. When the extruding pins press out the instrument panel 1, the air bag door 10 and the cores 21a, 21b are already separated. In this state, different from the conventional art, the pressing force of the extruding pins is not concentrated on the break groove 11. As a result, the instrument panel 1 can be properly taken out without whitening or damaging the break groove 11.

FIGS. 5-9 illustrate a molding apparatus A2 according to a second embodiment of the present invention. As seen from comparison between FIG. 5 and FIG. 2 and between FIG. 6 and FIG. 1, the molding apparatus A2 according to the second embodiment has a structure essentially similar to the molding apparatus A1 of the first embodiment, and thus has effect similar to the molding apparatus A1.

Figure 5:
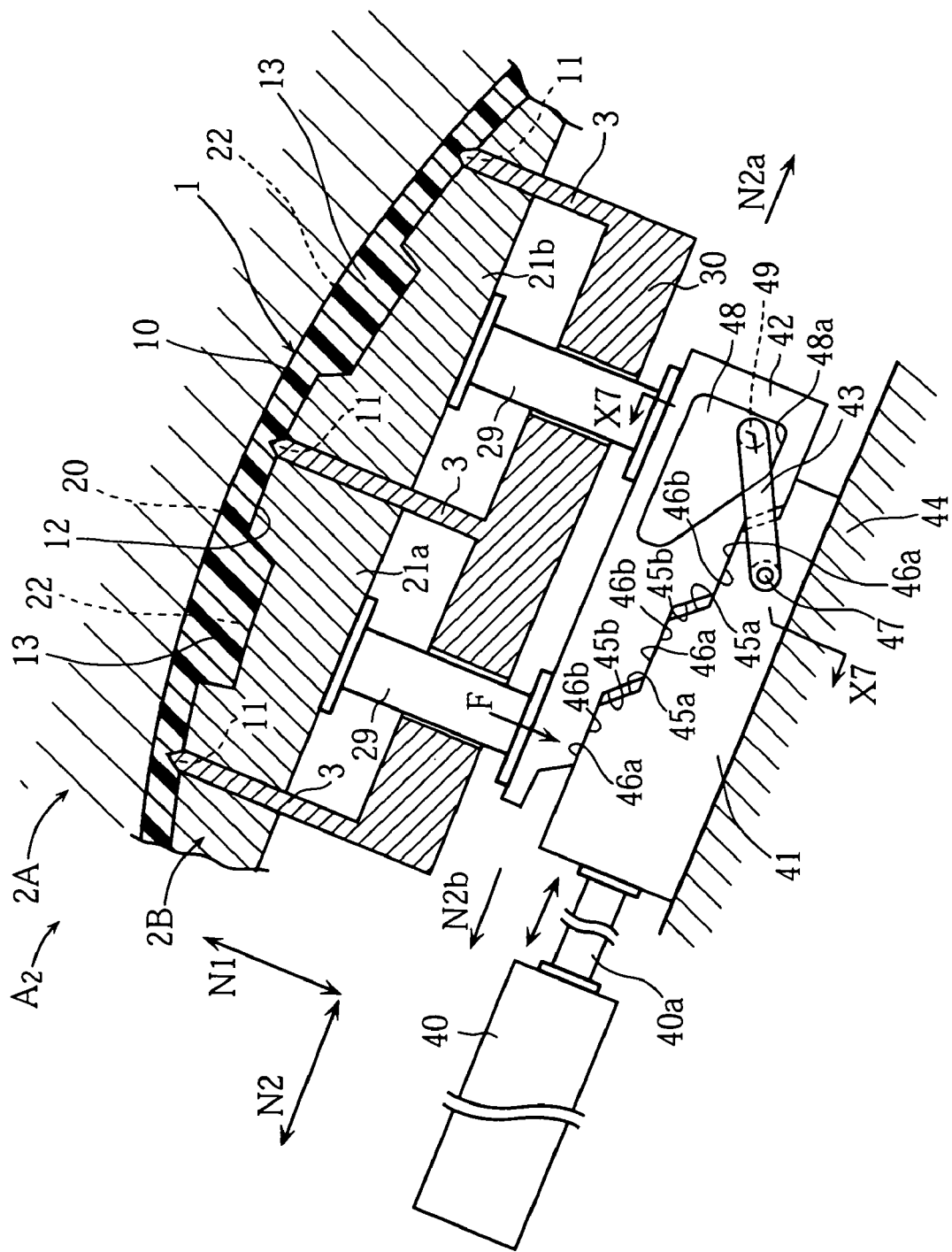
FIG. 5 is a view illustrating a principal part of a molding apparatus according to a second embodiment of the present invention.
Figure 6:
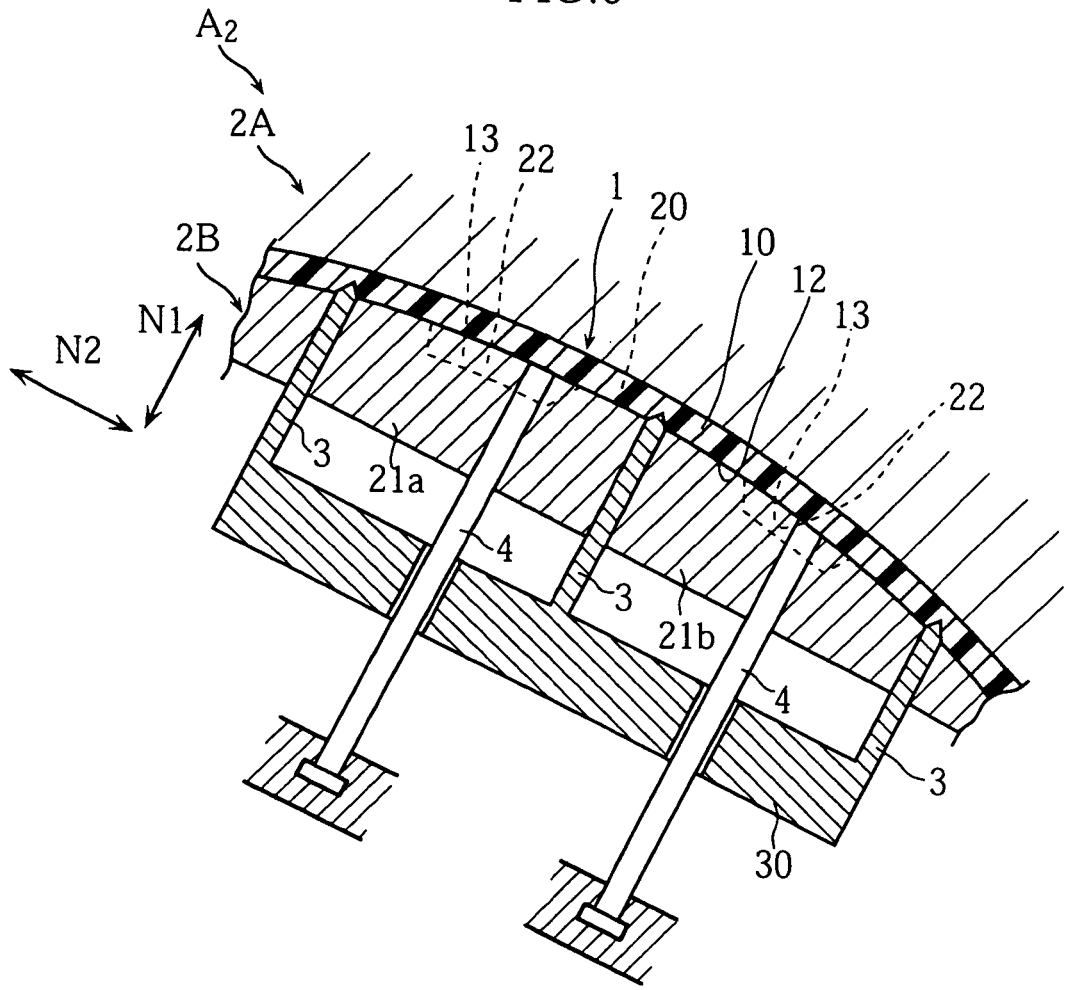
FIG. 6 is a view illustrating a principal part of a lower portion of the molding apparatus according to the second embodiment of the present invention.

Specifically, as shown in FIG. 5, the molding apparatus A2 includes a mold having an upper portion 2A and a lower portion 2B and also includes a plurality of grooving blades 3. Further, as shown in FIG. 6, the molding apparatus A2 includes a plurality of supporting rods 4 for contacting with a molded instrument panel 1. The upper portion 2A is movable toward and away from the lower portion 2B. The upper portion 2A and the lower portion 2B form a cavity 20 for molding the instrument panel 1. The lower portion 2B includes two movable cores 21a, 21b. The grooving blades 3 are inserted into the cavity 20 to form a plurality of break grooves 11 at the instrument panel 1. The grooving blades 3 are connected to each other via a connecting member 30. The supporting rods 4, as shown in FIG. 6, extend to penetrate the connecting member 30 and the cores 21a, 21b of the lower portion 2B.

The cores 21a, 21b of the lower portion 2B are formed with a plurality of recesses 22 for forming ribs 13. The cores 21a, 21b are movable slidably relative to the supporting rods 4 and also movable reciprocally in the direction N1 (refer to FIGS. 6 and 9). A mechanism used for the reciprocal movement, as shown in FIG. 5, includes a drive block 41, a follower block 42, a drive source 40 such as a hydraulic reciprocating cylinder. The drive block 41 is connected to the drive source 40 via a rod 40a and is reciprocally movable by the drive source 40 in the direction N2 on a base 44.

Figure 9:
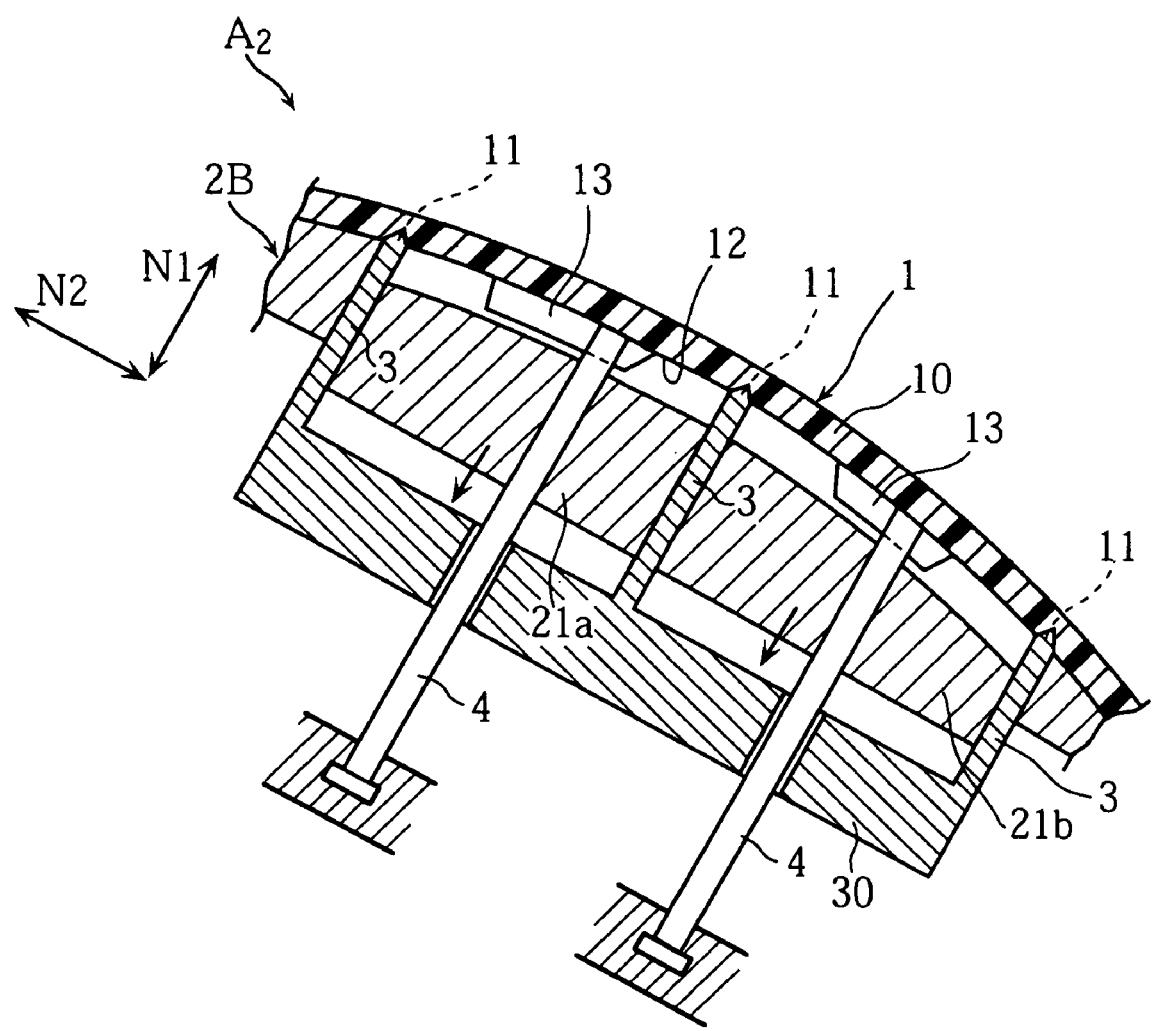
FIG. 9 is a section view illustrating the lower portion of the molding apparatus according to the second embodiment.

Similarly to the first embodiment, in the above-described molding apparatus A2 of the second invention, the supporting rods 4 contact with the instrument panel 1 molded in the cavity 20. Thus, as shown in FIG. 9, when the cores 21a, 21b are lowered, the supporting rods 4 prevent the downward movement of the air bag door 10. As a result, the air bag door 10 and the cores 21a, 21b can be separated without applying a large load on the break groove 11 of the instrument panel 1.

Next, different points between the molding apparatus A2 of the second embodiment and the molding apparatus A1 of the first embodiment are described below.

Specifically, the molding apparatus A2 differs from the molding apparatus A1 in the structure of the drive block 41 and the follower block 42. As shown in FIG. 5, the top surface of the drive block 41 is formed with steps thicknesswise (the direction N1) of the drive block 41. This step-like top surface includes a plurality of cam surfaces 45a and pressure receiving surfaces 46a arranged alternately in the direction N2. On the other hand, the bottom surface of the follower block 42 is formed with steps and includes a plurality of cam surfaces 45b and plan surfaces 46b arranged alternately, corresponding to the top surface of the drive block 41.

The cam surfaces 45a are inclined surfaces for lifting up the follower block 42 when the drive block 41 advances in the direction indicated as N2a in FIG. 5. The inclined angle (<90°) of the surface is e.g. 45 degrees or smaller relative to the direction N2. The cam surface 45b of the follower block 42 is an inclined surface parallel or substantially parallel to the cam surface 45a. The pressure receiving surface 46a of the drive block is a plan surface for receiving a load from the follower block 42 when the vertical movement of the follower block 42 is stopped. The pressure receiving surface 46a is inclined at an angle of zero or substantially zero relative to the direction N2. The plan surface 46b of the follower block 42 is parallel or substantially parallel to the pressure receiving surface 46a.

Figure 7:
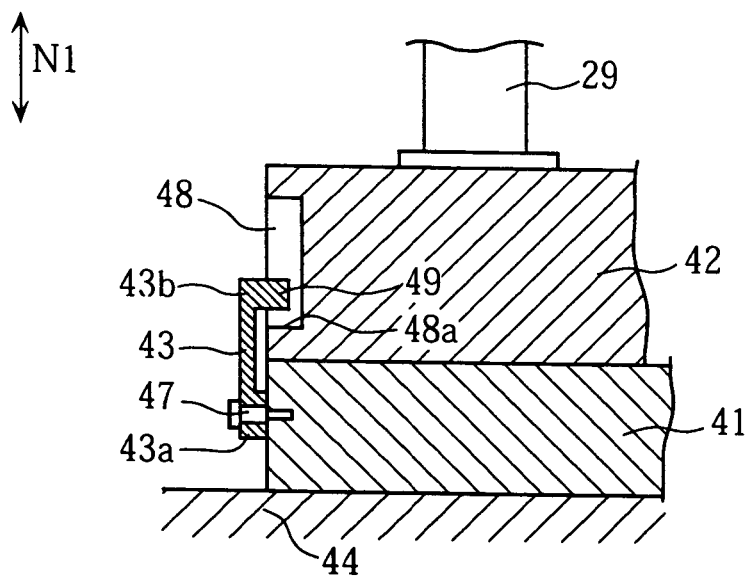
FIG. 7 is a section view illustrating the structure of a link for connecting a drive block and a follower block according to the second embodiment, taken along lines X7-X7 in FIG. 5.

The drive block 41 and the follower block 42 are connected to each other via a link 43. As shown in FIG. 7, the link 43 includes a bottom end 43a rotatably attached to the drive block 41 via a shaft 47. The link 43 further includes a top end 43b formed with a protrusion 49. The protrusion 49 engages with a recess 48 formed at the side surface of the follower block 42. As shown in FIG. 5, the recess 48 is designed to have a form and a size for allowing the protrusion 49 to play moderately in the directions N1 and N2. When the drive block 41 shifts in a direction N2b at more than a predetermined distance, the protrusion 49 engages with a wall 48a defining the recess 48, whereby the follower block 42 is pulled down by the link 43.

Next, the function of the drive block 41 and the follower block 42 of the molding apparatus A2 is described below.

First, as shown in FIG. 5, each pressure receiving surface 46a of the drive block 41 contacts respective plan surface 46b of the follower block 42 when the instrument panel 1 is molded in the cavity 20 of the mold. In this way, the downward movement of the follower block 42 is prevented and the cores 21a, 21b are not pressed downward by the pressure from the cavity 20. Since the pressure receiving surface 46a is not inclined relative to the direction N2, the pressing force F from the follower block 42 does not apply a large component force in the direction N2. Thus, all or almost all of the pressing force F can be supported by the base 44. As a result, the pressing force F is not applied directly to the drive source 40, and hence the drive source 40 can be downsized.

Figure 8:
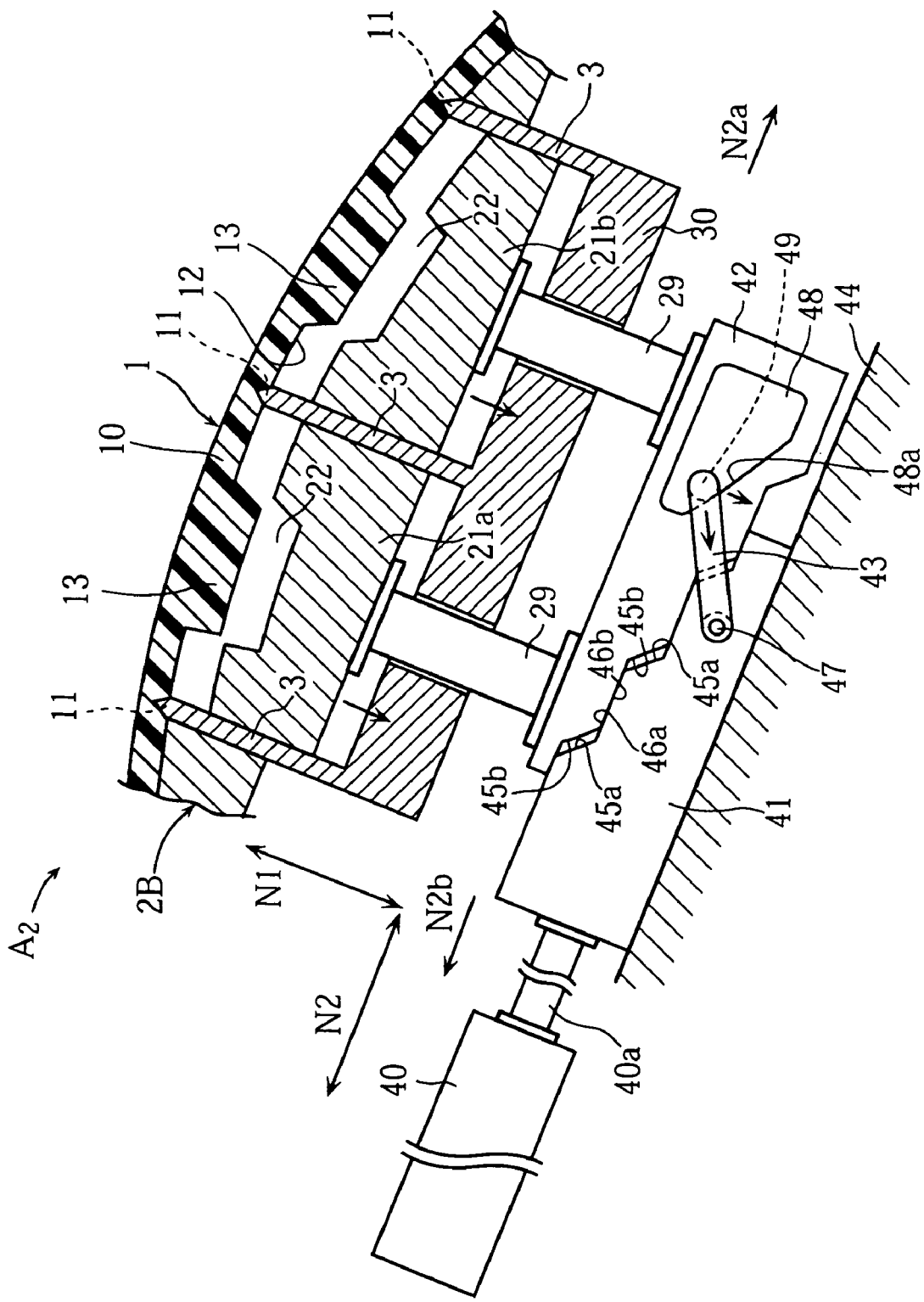
FIG. 8 illustrates the drive block, follower block, and link according to the second embodiment.

The instrument panel 1 is taken out in a step similar to the first embodiment after the instrument panel 1 is molded. Specifically, the upper portion 2A is lifted to open the mold. Next, the drive source 40 is driven to lower the cores 21a, 21b of the lower portion 2B as shown in FIG. 8. This downward movement is performed by shifting the drive block 41 in the direction N2b in FIG. 8, so that the follower block 42 is lowered due to the gravitational force. If the follower block 42 can not be lowered only by the gravitational force (if the cores 21a, 21b is fixed intimately to the instrument panel 1), the link 43 rotatably attached to the drive source 41 pulls and forcibly lowers the follower block 42.

After the instrument panel 1 is taken out, the cores 21a, 21b are moved upward to return to the initial position. This movement is performed by shifting the drive block 41 in the direction N2a at a proper distance by the drive source 40. When the drive block 41 advances, each of the inclined cam surfaces 45a slidably contacts with a respective cam surface 45b, whereby the follower block 42 is lifted up.

Figure 10:
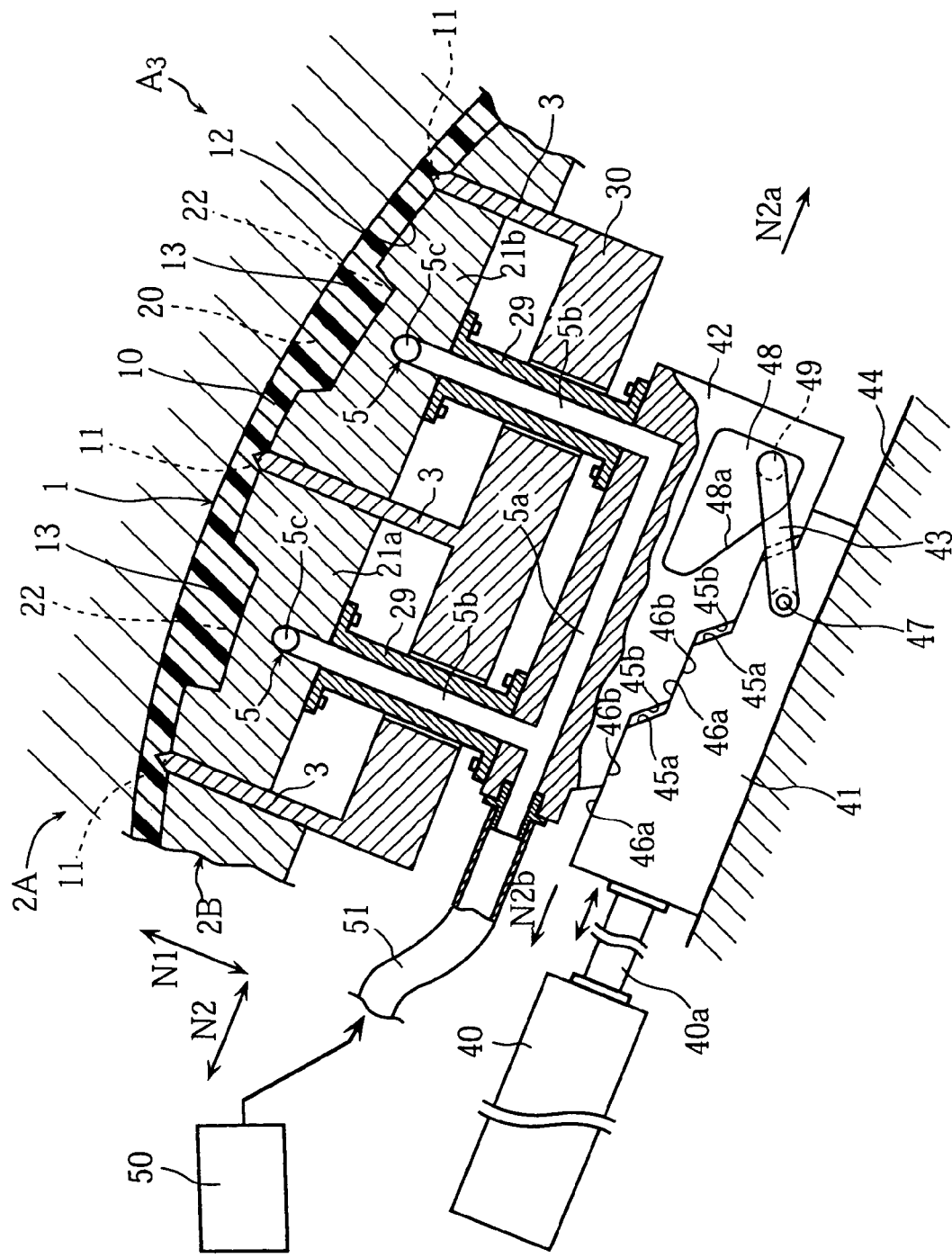
FIG. 10 is a view illustrating a principal part of a molding apparatus according to a third embodiment of the present invention.
Figure 11:
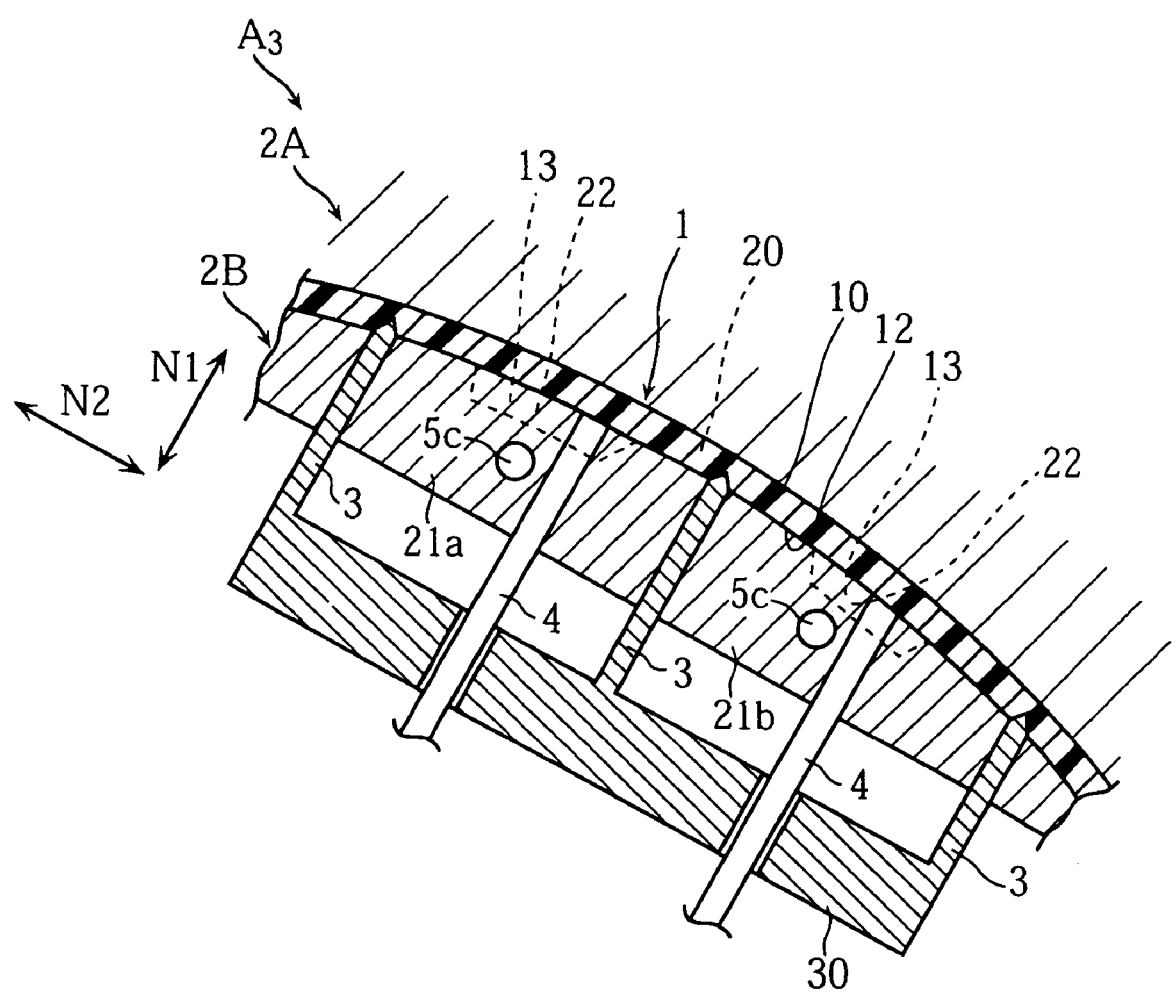
FIG. 11 is a section view illustrating a principal part of a lower portion according to the third embodiment.
Figure 12:
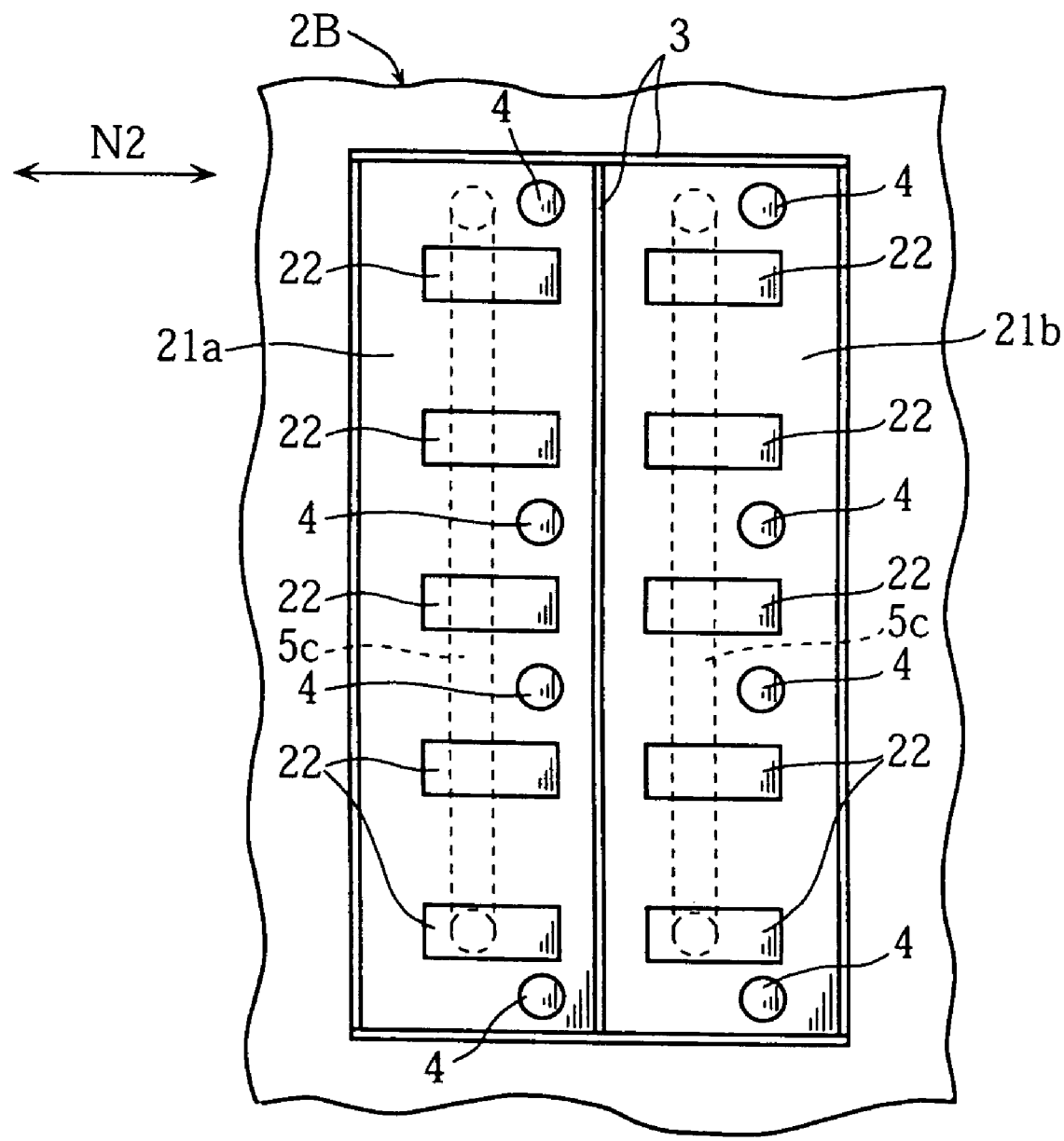
FIG. 12 is a plan view illustrating a principal part of the lower portion according to the third embodiment.

FIGS. 10-12 illustrate a molding apparatus A3 according to a third embodiment of the present invention.

As seen from the comparison between FIGS. 10 and 5 as well as between FIGS. 11 and 6, the molding apparatus A3 according to the third embodiment has a structure substantially similar to the molding apparatus A2 according to the second embodiment. Thus, the molding apparatus A3 has an effect similar to the molding apparatus A2 as described above.

The molding apparatus A3 according to the third embodiment differs from the molding apparatus A2 according to the second embodiment in having a cooling means for cooling the cores 21a, 21b.

As shown in FIG. 10, the cooling means according to the third embodiment includes a cooling water supplier 50, a pipe 51, and a cooling water path 5. The cooling water supplier 50 is provided outside of the upper portion A and lower portion 2B. The pipe 51 connects the cooling water supplier 50 to the cooling water path 5. The cooling water path 5 extends inside of the follower block 42, connecting rods 29, and cores 21a, 21b. The pipe 51 includes a flexible end connected to the follower block 42. Due to this structure, the follower block 42 can shift in the direction N1 without regulation by the pipe 51.

The cooling water path 5 includes a duct 5a provided at the follower block 42, a duct 5b provided at each connecting rod 29, and a duct 5c provided at each of the cores 21a, 21b. The ducts 5a-5c are connected in series. As shown in FIG. 12, the cores 21a, 21b are rectangular. The duct 5c extends longitudinally of the core so that a wide area of the core is cooled effectively. The cooling water passed through the duct 5c is discharged out of the mold via a non-illustrated duct.

Next, the function of the cooling means of the molding apparatus A3 is described below.

First, similarly to the first and second embodiments, the cavity 20 formed by the upper portion 2A and the lower portion 2B is filled with resin to mold the instrument panel 1. In the third embodiment, cooling water passes through the cooling water path 5 during the resin filling in the cavity 20. In this way, the cores 21a, 21b are cooled by the cooling water to reduce the thermal expansion rate of the cores 21a, 21b. As a result, the grooving blade 3 can be protected from damage or defective movement due to the thermal expansion of the cores 21a, 21b, more effective than in the apparatus without the cooling means. Here, the defective movement of the grooving blade 3 indicated the situation in which the grooving blade 3 is prevented from shifting in the direction N1 by the cores under thermal expansion.

There is another advantage in the cooling of the cores 21a, 21b. If the temperature rise at the cores 21a, 21b can be regulated, the portion formed to be the air bag door 10 is cooled and hardened in a relatively short time after the resin filling in the cavity 20. As a result, contraction rate of resin in this portion is reduced, whereby clumsy contraction in volume is less caused in the air bag door 10.

The cooling means for cooling the cores is not limited to the example shown in the drawings. For example, the cores may be cooled by a cooling medium brought into contact with the outer surface of the cores (other than the portions facing the cavity). The cooling medium is not limited to cold water, but other medium can be utilized.

Figure 13:
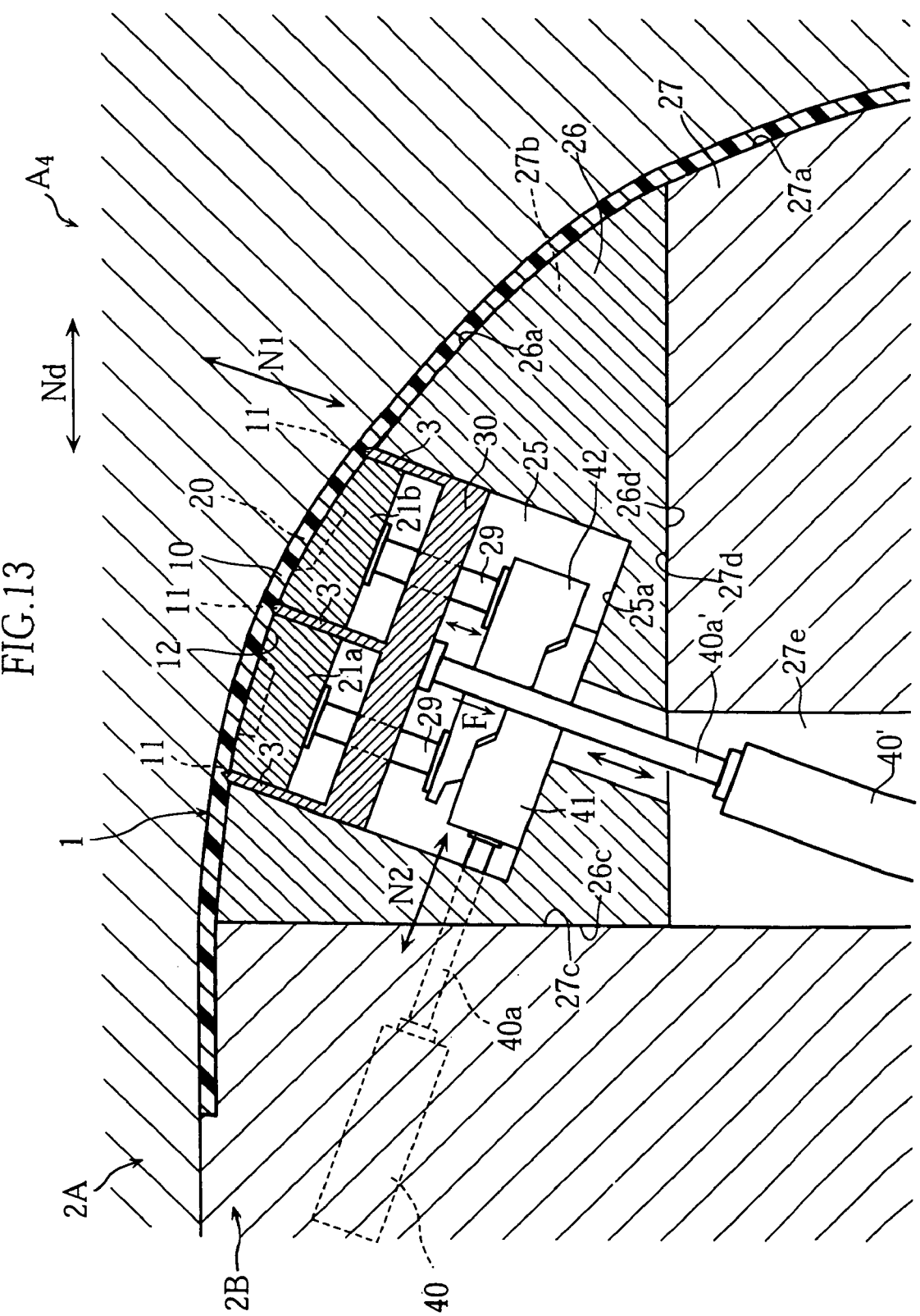
FIGS. 13 and 14 are views illustrating a principal part of a molding apparatus according to a fourth embodiment of the present invention.
Figure 14:
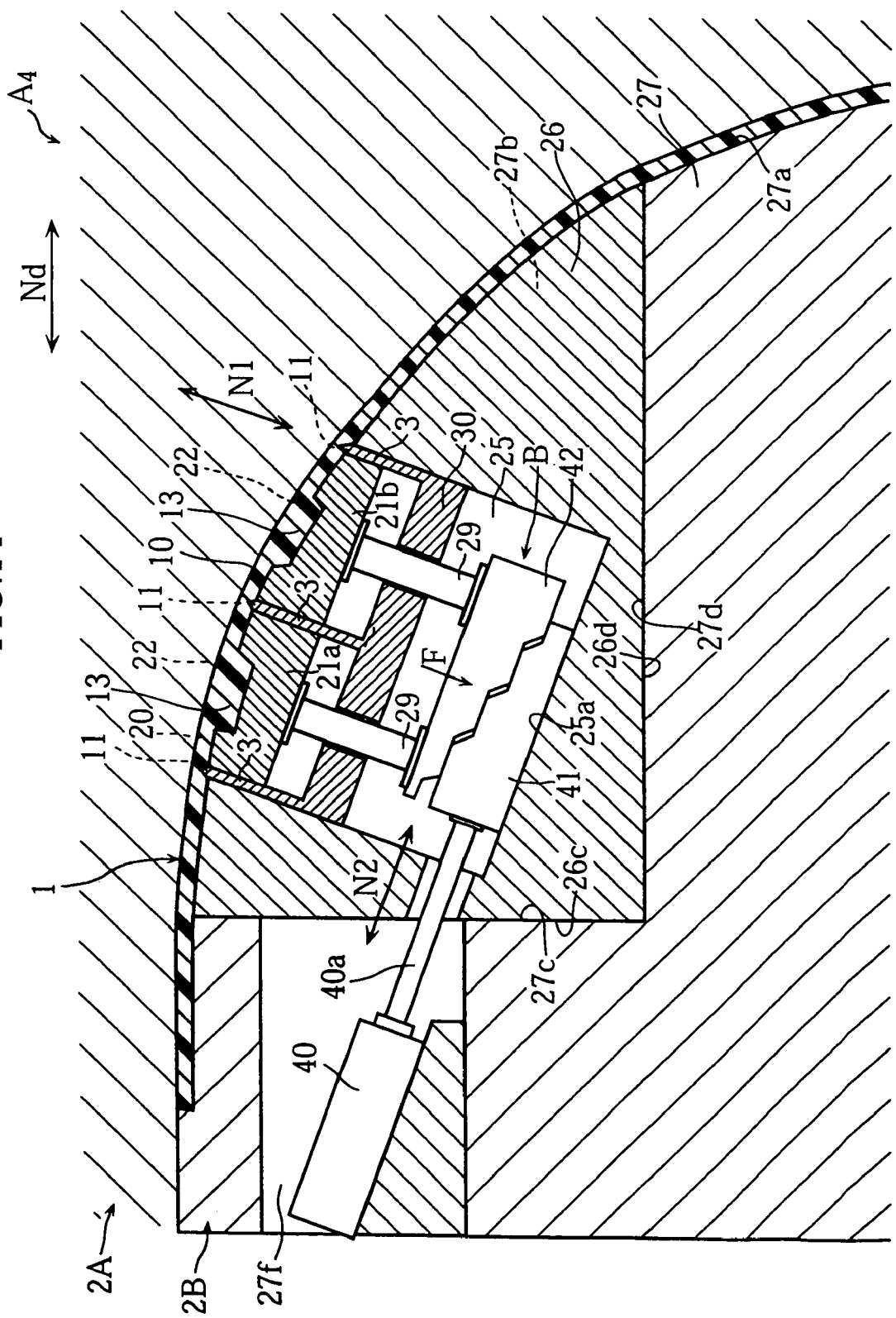
Figure 15:
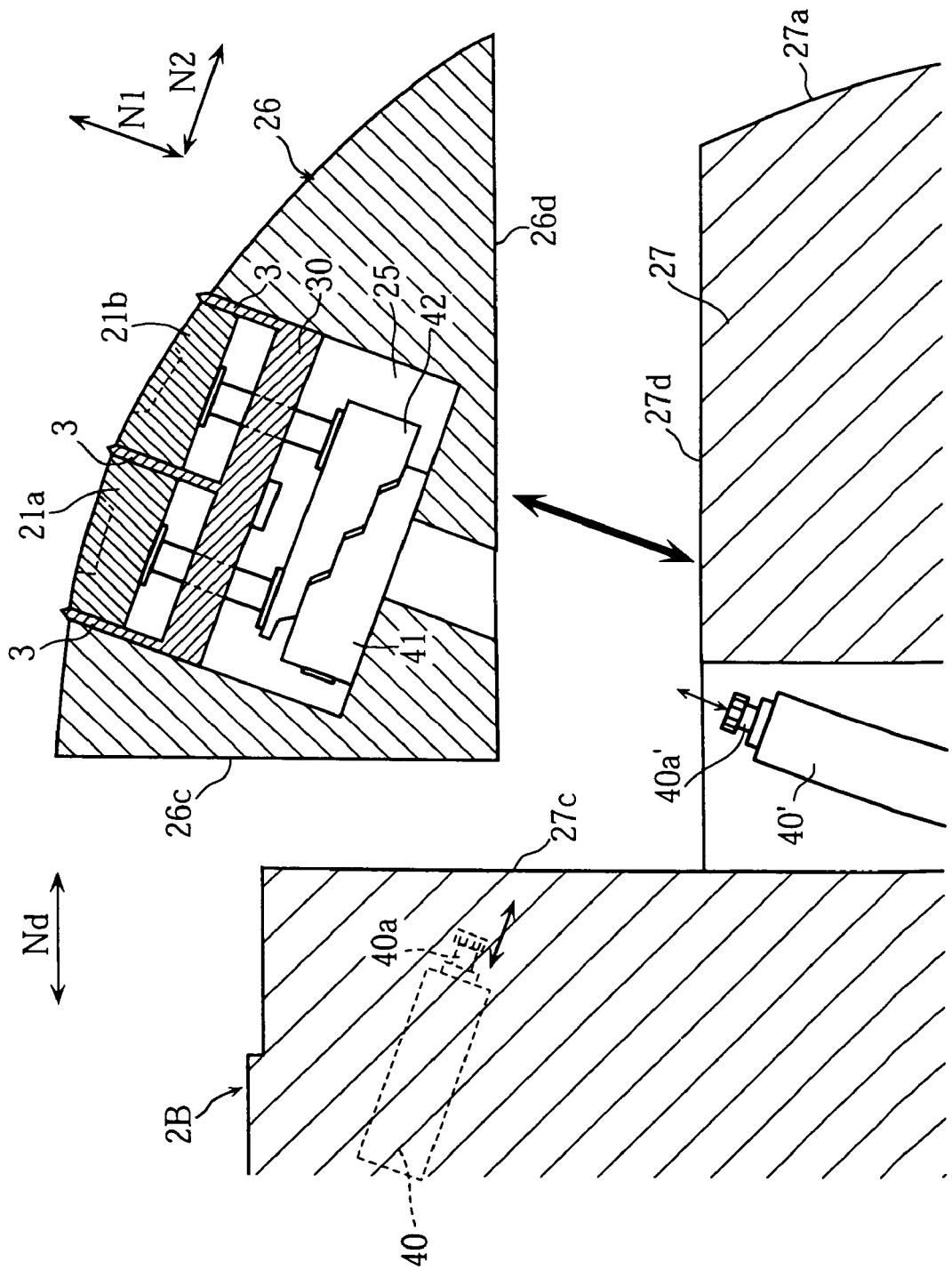
FIG. 15 is a view illustrating the advantageous effect of a lower portion of the molding apparatus according to the fourth embodiment.

FIGS. 13-15 illustrate a molding apparatus A4 according to a fourth embodiment of the present invention.

As shown in FIG. 13, the molding apparatus A4 includes an upper portion 2A, a lower portion 2B, a plurality of grooving blades 3, a drive block 41, a follower block 42, a first drive source 40, and a second drive source 40'.

The upper portion 2A is reciprocally movable in the horizontal direction indicated by Nd, and works together with the lower portion 2B to form a cavity 20. The lower portion 2B includes a replaceable auxiliary block 26 and a body 27 supporting the block 26. The block 26 is formed with a space 25 in which the grooving blades 3 and other members are incorporated.

The block 26 includes a surface 26a for molding a surface at and around the air bag door 10 of the instrument panel 1. The body 27 includes a surface 27a for molding a surface of the other portions of the instrument panel 1, and a space 27b for fixing the block 26 therein. The space 27b is defined by a vertical wall 27c and a horizontal wall 27d. The block 26 includes a side surface 26c and a bottom surface 26d, respectively contacting to the wall 27c and the vertical wall 27d, and fixed to the body 27. A bolting means (not shown), for example, may be utilized for the fixation.

Similarly to the above-described first to third embodiments, the lower portion 2B according to the fourth embodiment includes movable cores 21a, 21b for molding a surface of the air bag door 10. The cores 21a, 21b are connected to the follower block 42 via connecting rods 29. Similarly to the molding apparatuses according to the second and third embodiments, the drive block 41 is moved in a direction N2 by the first drive source 40, whereby the follower block 42 shifts in a direction N1. However, in the fourth embodiment, a link (refer to the reference number 43 in FIG. 5 or 10) is not used for connecting the drive block 41 and the follower block 42. Of course, the present invention is not limited to this example but the link 43 may be used also in the fourth embodiment. As shown in FIG. 14, the first drive source 40 is provided at a space 27f formed in the body 27.

The grooving blades 3 include tip ends reciprocally movable in and out of the cavity 20. The grooving blades 3 further include bottom ends connected to each other via a connecting member 30. The grooving blade 3 is connected to the second drive source 40' via a rod 40a'. The second drive source 40' is e.g. hydraulic cylinder for reciprocally moving the grooving blade 3 in the N1 direction. The drive source 40' is provided at a space 27e formed in the body 27. The rod 40a' includes a tip end removably attached to the connecting member 30. The space 25 includes inner walls serving as guide surfaces for the reciprocal movement of the grooving blade 3. Threaded engagement may be applied for the removable attachment of the tip end of the rod 40a' to the connecting member 30, by providing male and female screws. The above-described drive block 41 is also removably attached to a rod 40a by such threaded engagement.

Next, the function of the molding apparatus A4 is described below.

As shown in FIGS. 13 and 14, the cavity 20 formed by the upper portion 2A and the lower portion 2B is filled with resin to mold the instrument panel 1. During the resin filling, the second drive source 40' is driven to lower the grooving blade 3 so that the tip end is not inserted into the cavity 20. Then, before the filled resin is hardened, the grooving blade 3 is inserted into the cavity 20 to form the break groove 11.

After molding of the instrument panel 1 is finished, the instrument panel 1 is taken out of the mold. Specifically, the upper portion 2A is moved toward the right side in the Nd direction to open the mold, and the drive source 40 is driven to lower the cores 21a, 21b. A connecting rod (refer to the reference number 4 in FIG. 11) is provided also in the fourth embodiment in a contacting manner with the air bag door 10 of the instrument panel. Due to the structure, the air bag door 10 is prevented from lowering together with the cores 21a, 21b.

As shown in FIG. 15, the auxiliary block 26 of the lower portion 2B can be removed from the body 27. This structure is convenient when the block 26 is to be repaired. The movable members (cores 21a, 21b, grooving blades 3, drive block 41, and follower block 42) incorporated in the space 25 of the block 26 may need to be replaced because of wear, for example. This replacement can be facilitated by removing the block 26 from the body 27. If the lower portion 2B is formed as an integrated member, differently from this embodiment, the entire lower portion 2B needs to be replaced or repaired even only the portion corresponding to the block 26 is damaged. However, in the molding apparatus A4 according to the present invention, only the block 26 needs to be replaced or repaired.

In making the lower portion 2B, separately made block 26 and body 27 are assembled. In forming the space 25 in the block 26, the space 25 may be formed in vertical direction (at an inclined angle of 90°) or in horizontal direction (at an inclined angle of 0°), by accordingly determining the holding position of the block 26. Generally, it is easier to form a space at an inclined angle of 0° or of 90° than at other angles (0°<inclined angle<90°). Thus, it is advantageous to form the block 26 separately from the body 27 in that the formation of the lower portion 2B is facilitated.

The present invention being thus described, it is obvious that the same may be modified in various ways. Such modifications should not be regarded as a departure from the spirit and scope of the invention, and all such modifications as would be obvious to those skilled in the art are intended to be included in the scope of the appended claims.

The invention claimed is:

1. An apparatus for forming an air bag cover, the apparatus comprising:
   a mold for forming a cavity in which a resin air bag cover including an air bag door is made;
   a plurality of grooving blades connected to each other by a connecting member for forming a plurality of break grooves defining the air bag door at the air bag cover; and
   a supporting member provided separately from the plurality of grooving blades for supporting the air bag door of the air bag cover made in the cavity;
   wherein the mold includes a movable core reciprocally movable in a first reciprocal direction toward and away from the air bag cover, the supporting member being arranged between the plurality of grooving blades for coming into contact with the air bag door when the movable core is separated from the air bag door, the supporting member penetrating through the connecting member.

2. The apparatus according to claim 1, wherein the supporting member is a rod extending through the movable core.

3. The apparatus according to claim 1, wherein the movable core includes a recess for forming a rib at the air bag door, the supporting member contacting with the air bag door at a portion adjacent to the rib.

4. The apparatus according to claim 1 further comprising: a follower block connected to the movable core and reciprocally movable in the first reciprocal direction; a drive block contacting the follower block; and a first drive source for reciprocally moving the drive block along a second reciprocal direction perpendicular to the first reciprocal direction, wherein the follower block is moved in the first reciprocal direction by the movement of the drive block in the second reciprocal direction.

5. The apparatus according to claim 4, wherein at least one of the drive block and the follower block is formed with an inclined cam surface for moving the follower block in the first reciprocal direction.

6. The apparatus according to claim 4, wherein the drive block is formed with an inclined cam surface for moving the follower block in the first reciprocal direction and also formed with a pressure receiving surface next to the inclined cam surface, the pressure receiving surface being parallel to the second reciprocal direction.

7. The apparatus according to claim 6, wherein the follower block is formed with an inclined cam surface which is brought into contact with the inclined cam surface of the drive block and also formed with a plan surface next to the inclined cam surface of the follower block, the plan surface of the follower block being brought into contact with the pressure receiving surface of the drive block.

8. The apparatus according to claim 4 further comprising a link for connecting the drive block and the follower block, the link pulling the follower block away from the air bag door in accordance with the movement of the drive block.

9. The apparatus according to claim 8, wherein the link includes a first end and a second end spaced from each other, the first end rotatably attached to the drive block, the second end projecting into a recess formed in the follower block.

10. The apparatus according to claim 4 further comprising a second drive source for moving the plurality of grooving blades in the first reciprocal direction, the second drive source moving the plurality of grooving blades between a position to be inserted in the cavity and a position to be moved out of the cavity.

11. The apparatus according to claim 10 wherein the mold comprises an upper portion and a lower portion that work together to form the cavity, the lower portion including a support body and an auxiliary block removable from the body, the auxiliary block being formed with a space for movably incorporating the plurality of grooving blades in the first reciprocal direction, the second drive source being provided at the support body.

12. The apparatus according to claim 11, wherein the space of the auxiliary block further accommodates the follower block and the drive bock, the first drive source being provided at the support body.

13. The apparatus according to claim 12, wherein the first drive source, is connected to the drive block via a connecting rod removably attached to the drive block, the second drive source being connected to the plurality of grooving blades via another connecting rod removably attached to the grooving blade.

14. The apparatus according to claim 1 further comprising a cooling means for cooling the movable core.

15. The apparatus according to claim 14, wherein the cooling means includes a duct provided in the movable core through which cooling medium passes.

16. The apparatus according to claim 15, wherein the cooling means further includes another duct which is provided in the follower block and connected to the duct in the movable core.

17. The apparatus according to claim 1, wherein the plurality of grooving blades connected to each other via a connecting member, the support member comprising a rod extending through the connecting member.

* * * * *